(12) United States Patent
Wong

(10) Patent No.: US 10,068,497 B2
(45) Date of Patent: Sep. 4, 2018

(54) REFLECTION TEACHING AID

(71) Applicant: EDX EDUCATION CO., LTD., Taipei (TW)

(72) Inventor: Su-Chin Wong, Taipei (TW)

(73) Assignee: Edx Education Co., Ltd., Taipei (TW)

( * ) Notice: Subject to any disclaimer, the term of this patent is extended or adjusted under 35 U.S.C. 154(b) by 253 days.

(21) Appl. No.: 14/992,121

(22) Filed: Jan. 11, 2016

(65) Prior Publication Data

US 2017/0124915 A1    May 4, 2017

(30) Foreign Application Priority Data

Oct. 30, 2015    (TW) .............................. 104135710 A

(51) Int. Cl.
*G09B 23/22*    (2006.01)
*G09B 23/04*    (2006.01)

(52) U.S. Cl.
CPC ............. *G09B 23/04* (2013.01); *G09B 23/22* (2013.01)

(58) Field of Classification Search
USPC ........ 434/211, 214, 215, 300, 303; 446/219; 472/63
See application file for complete search history.

(56) References Cited

U.S. PATENT DOCUMENTS

| | | | | |
|---|---|---|---|---|
| 83,392 A * | 10/1868 | Manning | ................ | G09B 23/04 434/211 |
| 169,882 A * | 11/1875 | Adams | ................... | G02B 27/08 359/616 |
| 405,354 A * | 6/1889 | Hawk | .................... | G09B 23/04 342/8 |
| 718,326 A * | 1/1903 | Diem | ..................... | G02B 27/08 359/616 |
| 2,381,801 A * | 8/1945 | Bloxom | ................. | G02B 27/06 359/616 |
| 3,567,306 A * | 3/1971 | Spear | .................... | A63H 33/22 359/616 |
| 3,603,663 A * | 9/1971 | Lewis | ................... | G02B 27/08 359/616 |
| 4,696,554 A * | 9/1987 | Seawright | ............. | G02B 5/124 359/851 |
| 4,898,560 A * | 2/1990 | Moscovich | .......... | A63F 9/0613 359/850 |
| 4,948,241 A * | 8/1990 | Setteducati | ........... | G02B 27/08 359/616 |

(Continued)

FOREIGN PATENT DOCUMENTS

CN    2565036 Y    8/2003

*Primary Examiner* — Kurt Fernstrom
(74) *Attorney, Agent, or Firm* — LeClairRyan

(57) ABSTRACT

A reflection teaching aid includes a mounting board and first and second plane mirrors. The mounting board has a plurality of slots that are angularly displaced from each other. When inserting edges of the first and second plane mirrors are inserted respectively into two selected ones of the slots, and when an object is disposed between reflective surfaces of the first and second plane mirrors, a selected one of included angles is formed between the reflective surfaces of the first and second plane mirrors, thereby permitting an object placed between the reflective surfaces of the first and second plane mirrors to generate a corresponding number of reflected images of the object.

3 Claims, 4 Drawing Sheets

(56) References Cited

U.S. PATENT DOCUMENTS

| | | | | |
|---|---|---|---|---|
| 4,952,004 | A | * | 8/1990 | Baird ................... G02B 27/08 |
| | | | | 359/616 |
| 5,180,222 | A | * | 1/1993 | Robinson ............... A47F 3/001 |
| | | | | 312/223.5 |
| 6,062,698 | A | * | 5/2000 | Lykens .................. G02B 27/08 |
| | | | | 359/616 |
| 6,792,707 | B1 | * | 9/2004 | Setteducati ............ G09F 19/14 |
| | | | | 359/831 |
| 7,418,925 | B2 | * | 9/2008 | Rutherford ............ A01K 31/06 |
| | | | | 119/467 |
| 8,678,834 | B2 | * | 3/2014 | Calandrini ......... G01M 11/0257 |
| | | | | 351/159.01 |

\* cited by examiner

REFLECTION TEACHING AID

CROSS-REFERENCE TO RELATED APPLICATION

This application claims priority from Taiwanese application no. 104135710, filed on Oct. 30, 2015.

FIELD

The disclosure relates to a teaching aid, more particularly to a reflection teaching aid for teaching multiple reflections to students.

BACKGROUND

When two plane mirrors are held at an angle to each other, multiple reflected images of an object disposed between reflective surfaces of the plane mirrors can be observed. The number of reflected images varies depending on the angle defined between the reflective surfaces.

When a teacher wants to show such multiple reflected images to students in teaching multiple reflection, he/she needs to hold two plane mirrors at an angle with both hands while explaining the formation of multiple reflected images. This is inconvenient.

SUMMARY

Therefore, the disclosure aims to provide a reflection teaching aid in which plane mirrors can be held in an upstanding position by a mounting board and an angle between reflective surfaces of the plane mirrors can be adjusted easily.

According to the disclosure, a reflection teaching aid includes a mounting board and first and second flat mirrors. The mounting board has a front marginal side, a rear marginal side, a left marginal side, and a right marginal side. The rear marginal side extends in a longitudinal direction and has a center point. The mounting board has an upper major surface which has a depressed area and a non-depressed area. The depressed area is bordered by the rear marginal side. The non-depressed area is bordered by the front, left, and right marginal sides. The depressed area and the non-depressed area define therebetween a boundary shoulder extending in a circumferential direction about the center point. The non-depressed area has a plurality of slots each extending in a radial direction relative to the center point and through the boundary shoulder. The slots being angularly displaced from each other about the center point by a predetermined arc length. Each of the first and second plane mirrors extends lengthwise to terminate at an angle-forming edge and an inserting edge opposite to the angle-forming edge. The inserting edges of the first and second plane mirrors are configured to be insertable respectively into two selected ones of the slots such that the first and second plane mirrors are held in an upstanding position, and such that a selected one of included angles is formed between reflective surfaces of the first and second plane mirrors while the angle-forming edges of the first and second plane mirrors adjoin to each other, thereby permitting an object placed between the reflective surfaces of the first and second plane mirrors to generate a corresponding number of reflected images of the object.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Figure 1:
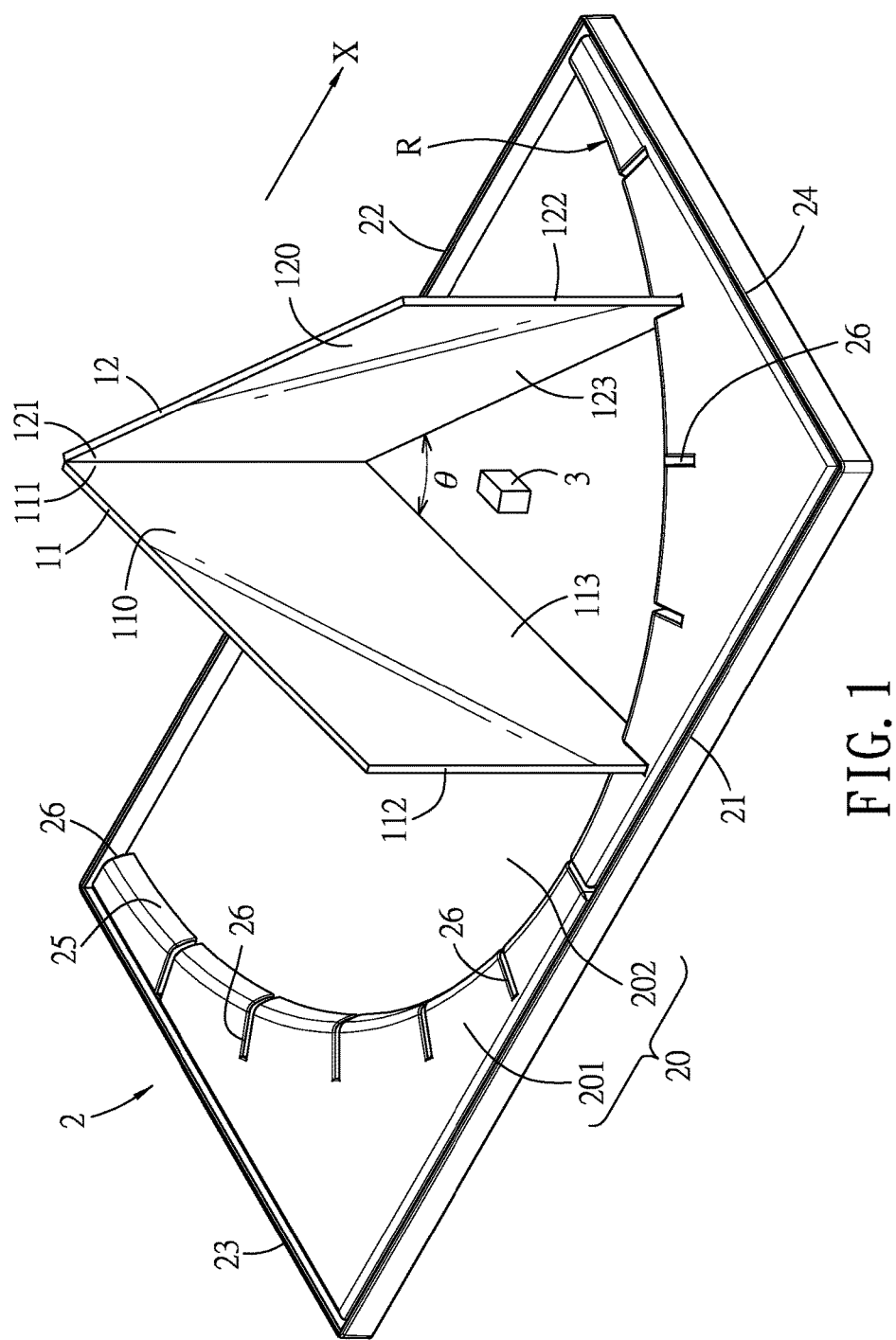
FIG. 1 is a perspective view of a reflection teaching aid according to a first embodiment of the disclosure.

Before the disclosure is described in greater detail, it should be noted that like elements are denoted by the same reference numerals throughout the disclosure.

Figure 2:
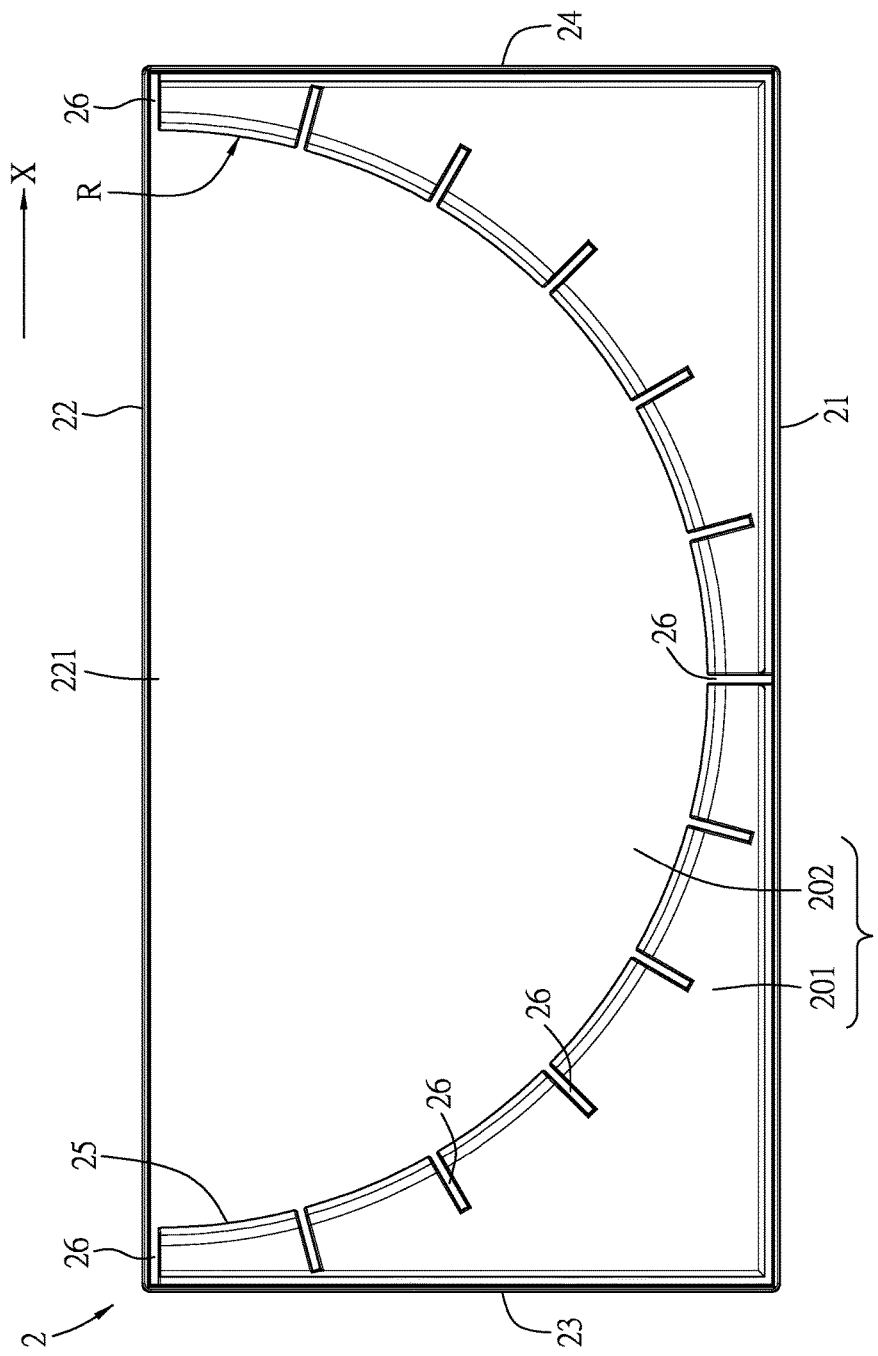
FIG. 2 is a top view of a mounting board of the reflection teaching aid according to the first embodiment of the disclosure.

With reference to FIGS. 1 and 2, a reflection teaching aid for teaching multiple reflection to students includes a mounting board 2, a first plane mirror 11, and a second plane mirror 12.

The mounting board 2 is of a rectangular shape, and has a front marginal side 21, a rear marginal side 22, a left marginal side 23, and a right marginal side 24. The rear marginal side 22 extends in a longitudinal direction (X) and has a center point 221. The mounting board 2 has an upper major surface 20 which has a non-depressed area 201 and a depressed area 202. The depressed area 202 is bordered by the rear marginal side 22. The non-depressed area 201 is bordered by the front, left, and right marginal sides 21, 23, 24. The non-depressed area 201 and the depressed area 202 define therebetween a boundary shoulder 25 extending in a circumferential direction about the center point 221. The non-depressed area 201 has a plurality of slots 26 each extending downwardly and each extending in a radial direction relative to the center point 221 and through the boundary shoulder 25. The slots 26 are angularly displaced from each other about the center point 221 by a predetermined arc length. In this embodiment, two adjacent ones of the slots 26 are angularly displaced by an angle of 15°. Please note that the angle should not be limited to 15° and may be varied depending on actual requirements.

The first plane mirror 11 has a reflective surface 110, and extends lengthwise to terminate at an angle-forming edge 111 and an inserting edge 112 opposite to the angle-forming edge 111. The first plane mirror 11 further has a bottom end 113 extending between the angle-forming edge 111 and the inserting edge 112. The second plane mirror 12 has a reflective surface 120, and extends lengthwise to terminate at an angle-forming edge 121 and an inserting edge 122 opposite to the angle-forming edge 121. The second plane mirror 12 further has a bottom end 123 extending between the angle-forming edge 121 and the inserting edge 122. The inserting edges 112, 122 of the first and second plane mirrors 11, 12 are configured to be insertable respectively into two selected ones of the slots 26 such that the first and second plane mirrors 11, 12 are held in an upstanding position (see FIG. 1), and such that a selected one of included angles (θ) is formed between the reflective surfaces 110, 120 of the first and second plane mirrors 11, 12 while the angle-forming edges 111, 121 of the first and second plane mirrors 11, 12 adjoin to each other, thereby permitting an object 3 placed between the reflective surfaces 110, 120 of the first and second plane mirrors 11, 12 to generate a corresponding number of reflected images of the object 3.

In this embodiment, the depressed area 202 is a semicircular depressed area, and the boundary shoulder 25 extends along a semicircular arc (R).

In this embodiment, when the inserting edges 112, 122 of the first and second plane mirrors 11, 12 are respectively inserted into two adjacent ones of the slots 26, the included angle ($\theta$) is 15°. As shown in FIG. 1, when the first and second plane mirrors 11, 12 are mounted on the mounting board 2 with two slots 26 disposed between the first and second plane mirrors 11, 12, the included angle ($\theta$) is 45°.

Figure 3:
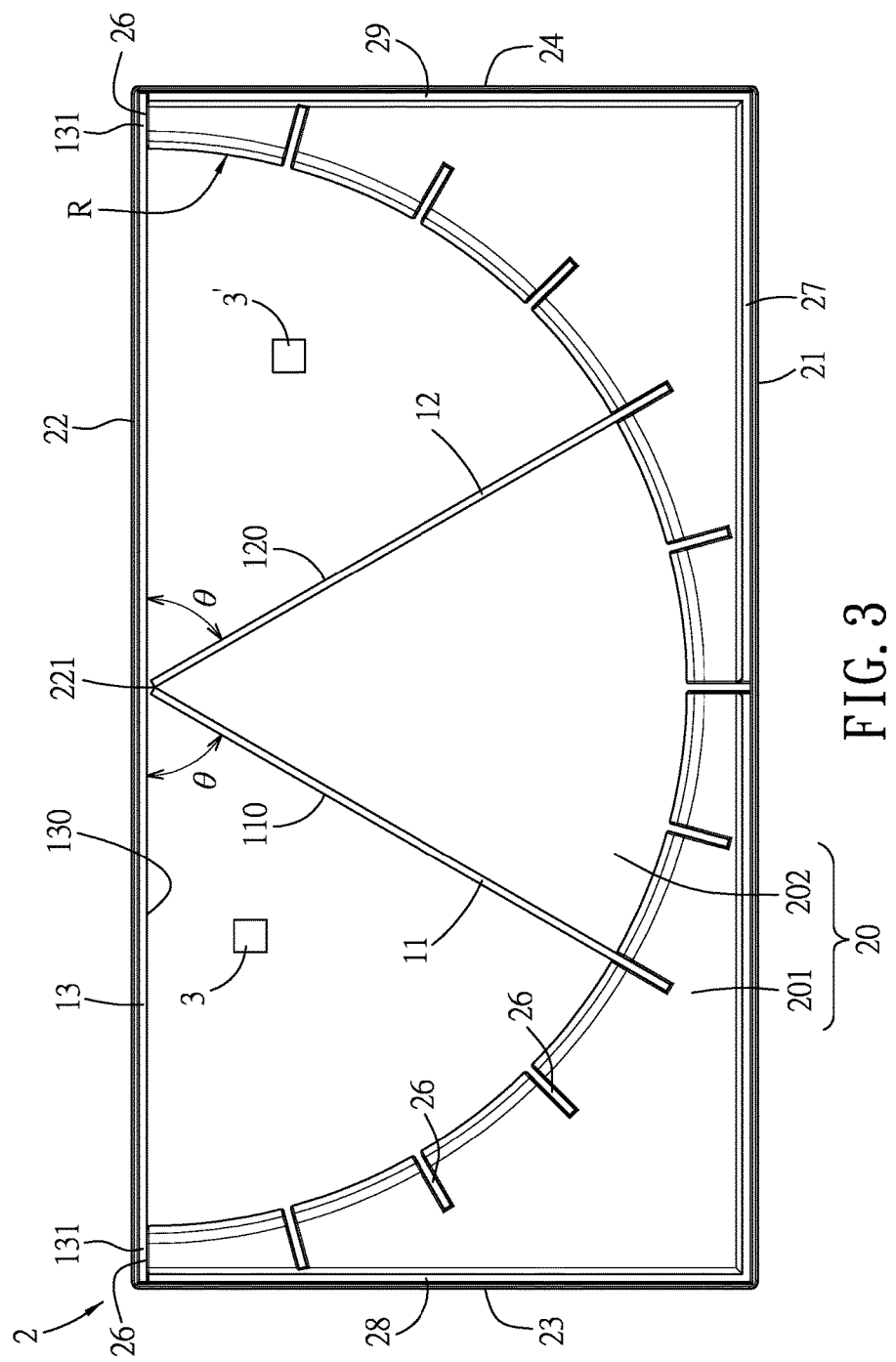
FIG. 3 is similar to FIG. 2 but showing first, second, and third plane mirrors mounted on the mounting board.

As shown in FIG. 3, two of the slots 26 are diametrically opposite to each other, each of which is bordered by the rear marginal side 22. The reflection teaching aid further includes a third plane mirror 13. The third plane mirror 13 has a reflective surface 130 and extends lengthwise to terminate at two opposite edges 131 which are configured to be insertable respectively into the diametrically opposite slots 26 to permit the third plane mirror 13 to be held in an upstanding position. When the first, second, and third plane mirrors 11, 12, 13 are used, two objects 3, 3' may be disposed on the mounting board 2 to demonstrate multiple reflections. The object 3 is disposed between the reflective surfaces 110, 130 of the first and third plane mirrors 11, 13, and the object 3' is disposed between the reflective surfaces 120, 130 of the second and third plane mirrors 12, 13 so that reflected images of the objects 3, 3' can be observed between the first and third plane mirrors 11, 13 and between the second and third plane mirrors 12, 13. In FIG. 3, the included angle ($\theta$) between the first and third plane mirrors 11, 13 is the same as the included angle ($\theta$) between the second and third plane mirrors 12, 13 (i.e., the reflected images of the object 3 are substantially the same as the reflected images of the object 3'), and students sitting at different positions can choose one of the objects 3, 3' for observation. Furthermore, when the included angle ($\theta$) between the first and third plane mirrors 11, 13 is different from the included angle ($\theta$) between the second and third plane mirrors 12, 13, students can observe different numbers of reflected images of the objects 3, 3'. Furthermore, an additional plane mirror (not shown) may be disposed on the depressed area 202 below the first and second plane mirrors 11, 12.

Furthermore, in other embodiments, the third plane mirror 13 may be substituted by two plane mirrors (not shown) each being substantially the same as the first or second plane mirror 11 or 12.

In other embodiments, each of the slots 26 may be defined by two protrusions (not shown) formed on the mounting board 2.

Moreover, as shown in FIG. 3, the non-depressed area 201 further includes front, left, and right elongated slots 27, 28, 29 which are bordered by the front, left, and right marginal sides 21, 23, 24, respectively. Each of the front, left, and right elongated slots 27, 28, 29 is configured to permit the bottom end 113 or 123 (shown in FIG. 1) of one of the first and second plane mirrors 11, 12 to be inserted thereinto, thereby allowing a corresponding one of the first and second plane mirrors 11, 12 to be held in the upstanding position. In addition, the elongated slot 27 is also configured to permit a bottom end (not shown) of the third plane mirror 13 to be inserted thereinto.

Figure 4:
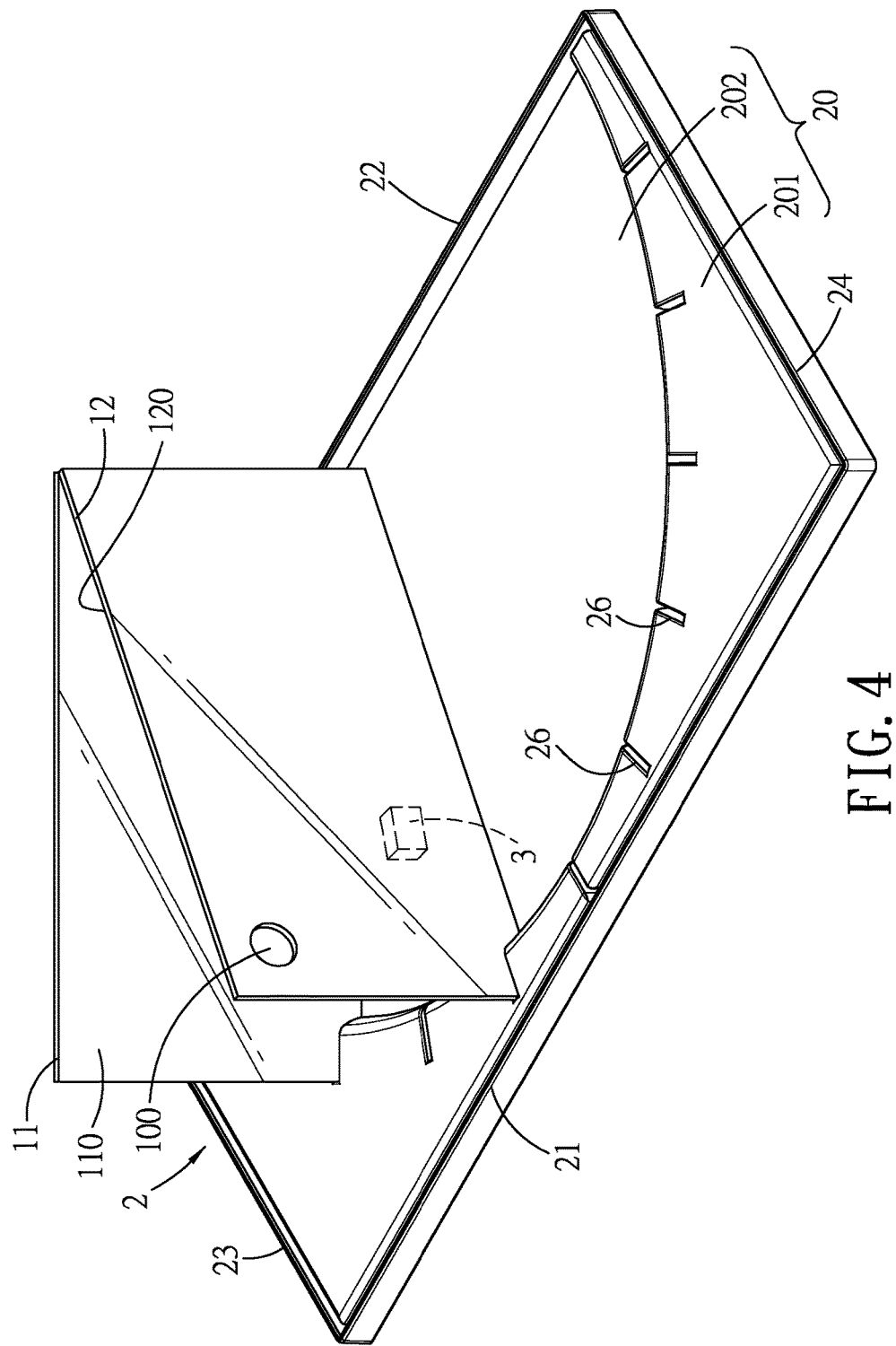
FIG. 4 is a perspective view of a reflection teaching aid according to a second embodiment of the disclosure.

FIG. 4 shows a reflection teaching aid according to a second embodiment of the disclosure. The second embodiment is substantially the same as the first embodiment except that the second plane mirror 12 has a through hole 100. The reflective surface 110 of the first plane mirror 11 may be observed through the through hole 100 of the second plane mirror 12.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A reflection teaching aid comprising:
   a mounting board having a front marginal side, a rear marginal side, a left marginal side, and a right marginal side, said rear marginal side extending in a longitudinal direction and having a center point, said mounting board having an upper major surface which has a depressed area and a non-depressed area, said depressed area being bordered by said rear marginal side, said non-depressed area being bordered by said front, left, and right marginal sides, said depressed area and said non-depressed area defining therebetween a boundary shoulder extending in a circumferential direction about said center point, said non-depressed area having a plurality of slots each extending in a radial direction relative to said center point and through said boundary shoulder, said slots being angularly displaced from each other about said center point by a predetermined arc length; and
   first and second plane mirrors each extending lengthwise to terminate at an angle-forming edge and an inserting edge opposite to said angle-forming edge, said inserting edges of said first and second plane mirrors being configured to be insertable respectively into two selected ones of said slots such that said first and second plane mirrors are held in an upstanding position, and such that a selected one of included angles is formed between reflective surfaces of said first and second plane mirrors while said angle-forming edges of said first and second plane mirrors adjoin to each other, thereby permitting an object placed between said reflective surfaces of said first and second plane mirrors to generate a corresponding number of reflected images of the object,
   wherein said depressed area is a semicircular depressed area, and
   wherein two of said slots are diametrically opposite to each other, each of which is bordered by said rear marginal side, said reflection teaching aid further comprising a third plane mirror which has two opposite edges configured to be insertable respectively into said diametrically opposite slots to permit said third plane mirror to be held in an upstanding position.

2. The reflection teaching aid according to claim 1, wherein when said inserting edges of said first and second plane mirrors are respectively inserted into two adjacent ones of said slots, the included angle is 15°.

3. The reflection teaching aid according to claim 1, wherein each of said first and second plane mirrors has a bottom end extending between said angle-forming edge and said inserting edge, and said non-depressed area has front, left, and right elongated slots which are bordered by said front, left, and right marginal sides, respectively, each of said front, left, and right elongated slots being configured to permit said bottom end of one of said first and second plane mirrors to be inserted thereinto, thereby allowing a corresponding one of said first and second plane mirrors to be held in the upstanding position.

* * * * *